United States Patent
Burnett et al.

(10) Patent No.: US 7,827,426 B2
(45) Date of Patent: Nov. 2, 2010

(54) LOW POWER MODE OVERRIDE SYSTEM AND METHOD

(75) Inventors: Angela Burnett, Indianapolis, IN (US); Minqing (Mike) Xing, Fishers, IN (US)

(73) Assignee: TTE Technology Inc., Indianapolis, IN (US)

( * ) Notice: Subject to any disclaimer, the term of this patent is extended or adjusted under 35 U.S.C. 154(b) by 726 days.

(21) Appl. No.: 11/810,002

(22) Filed: Jun. 4, 2007

(65) Prior Publication Data

US 2007/0283179 A1    Dec. 6, 2007

Related U.S. Application Data

(60) Provisional application No. 60/811,071, filed on Jun. 5, 2006.

(51) Int. Cl.
*G06F 1/26* (2006.01)
(52) U.S. Cl. ............ 713/323; 713/300; 713/320; 713/324
(58) Field of Classification Search .......... 713/300, 713/323, 324
See application file for complete search history.

(56) References Cited

U.S. PATENT DOCUMENTS

| | | | |
|---|---|---|---|
| 4,751,580 A | 6/1988 | Fitzgerald et al. | |
| 5,414,475 A | 5/1995 | Trzyna et al. | |
| 6,985,191 B2 * | 1/2006 | Choi | 348/730 |
| 7,283,180 B2 * | 10/2007 | Choi | 348/730 |
| 2002/0104031 A1 * | 8/2002 | Tomlinson et al. | 713/320 |
| 2005/0215274 A1 * | 9/2005 | Matson et al. | 455/522 |
| 2005/0216943 A1 | 9/2005 | Rodolico | |
| 2006/0005219 A1 | 1/2006 | Owens | |
| 2008/0030306 A1 * | 2/2008 | O'Toole et al. | 340/10.4 |

FOREIGN PATENT DOCUMENTS

| | | |
|---|---|---|
| JP | 2000125226 A | 4/2000 |
| WO | WO2005002216 A1 | 1/2005 |

* cited by examiner

*Primary Examiner*—Nitin C Patel
(74) *Attorney, Agent, or Firm*—Fletcher Yoder PC

(57) ABSTRACT

An exemplary method of operating an electronic device comprises determining if the electronic device is in a low power mode. The exemplary method also comprises continuing normal operation if the electronic device is not in the low power mode, determining if a wake-up timer is set if the electronic device is in the low power mode, continuing normal operation in low power mode if the wake-up timer is not set, and disabling low power mode if the electronic device is in the low power mode of operation and the wake-up timer is set.

20 Claims, 2 Drawing Sheets

LOW POWER MODE OVERRIDE SYSTEM AND METHOD

CROSS REFERENCE TO RELATED APPLICATION

This application claims priority based on U.S. Provisional Application Ser. No. 60/811,071 filed on Jun. 5, 2006, which is incorporated by reference as though completely set forth herein.

BACKGROUND

This section is intended to introduce the reader to various aspects of art which may be related to various aspects of the present invention that are described below. This discussion is believed to be helpful in providing the reader with background information to facilitate a better understanding of the various aspects of the present invention. Accordingly, it should be understood that these statements are to be read in this light, and not as admissions of prior art.

Many televisions are now supporting a low power operating mode to conserve power when they are not turned on. In many cases a separate microcontroller remains powered during the low power mode, while all other devices in the television, including the main microcontroller or processor are powered down. The separate microcontroller that maintains the operation of low power mode is referred to herein as a "low power microcontroller." The low power microcontroller is responsible for powering the TV on when the user presses the "power on" button on the remote control or front panel.

The low power microcontroller adds to system cost and complexity because it must duplicate some functionality typically performed by the system main microcontroller. For example, if the system supports the use of wake-up timers, the low power microcontroller must be adapted to keep track of time of day and determine whether a wake-up timer is set when the system is in low power mode.

DETAILED DESCRIPTION OF THE PREFERRED EMBODIMENT

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
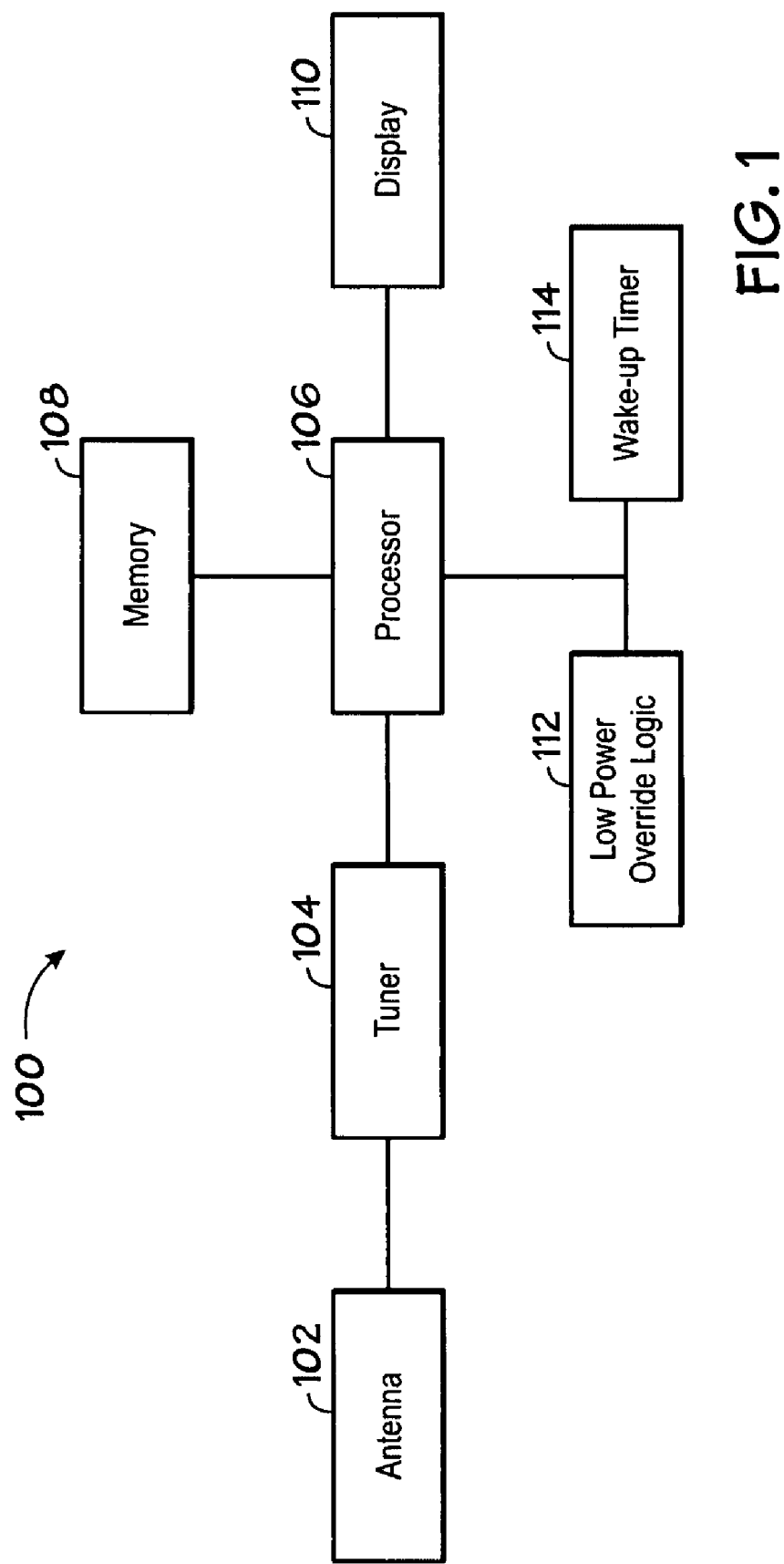
FIG. 1 is a block diagram of an electronic device that may employ an embodiment of the present invention.

FIG. 1 is a block diagram of an electronic device that may employ an embodiment of the present invention. The electronic device is generally referred to by the reference number 100. The electronic device 100 (for example, a television, digital video recorder, set top box or the like) comprises an antenna 102, a tuner 104, a processor 106, a memory 108 and a display 110. The memory 108 may be adapted to hold machine-readable computer code that causes the processor 106 to control the operation of the electronic device 100.

An exemplary embodiment of the present invention includes low power override logic 112. The low power override logic 112 is adapted to detect whether certain functionality is enabled while the electronic device 100 is operating in a low power mode. In an exemplary embodiment of the present invention, the low power override logic 112 is adapted to detect when a wake-up timer is set. If a wake-up timer is set, the low power override logic is adapted to disable low power mode so that the wake-up timer may be maintained by the processor 106 without resort to a second microcontroller such as a low power microcontroller.

An exemplary embodiment of the present invention is implemented as a programmable logic device such as a field programmable gate array (FPGA). The amount of logic included in the FPGA can be limited to minimize cost.

Figure 2:
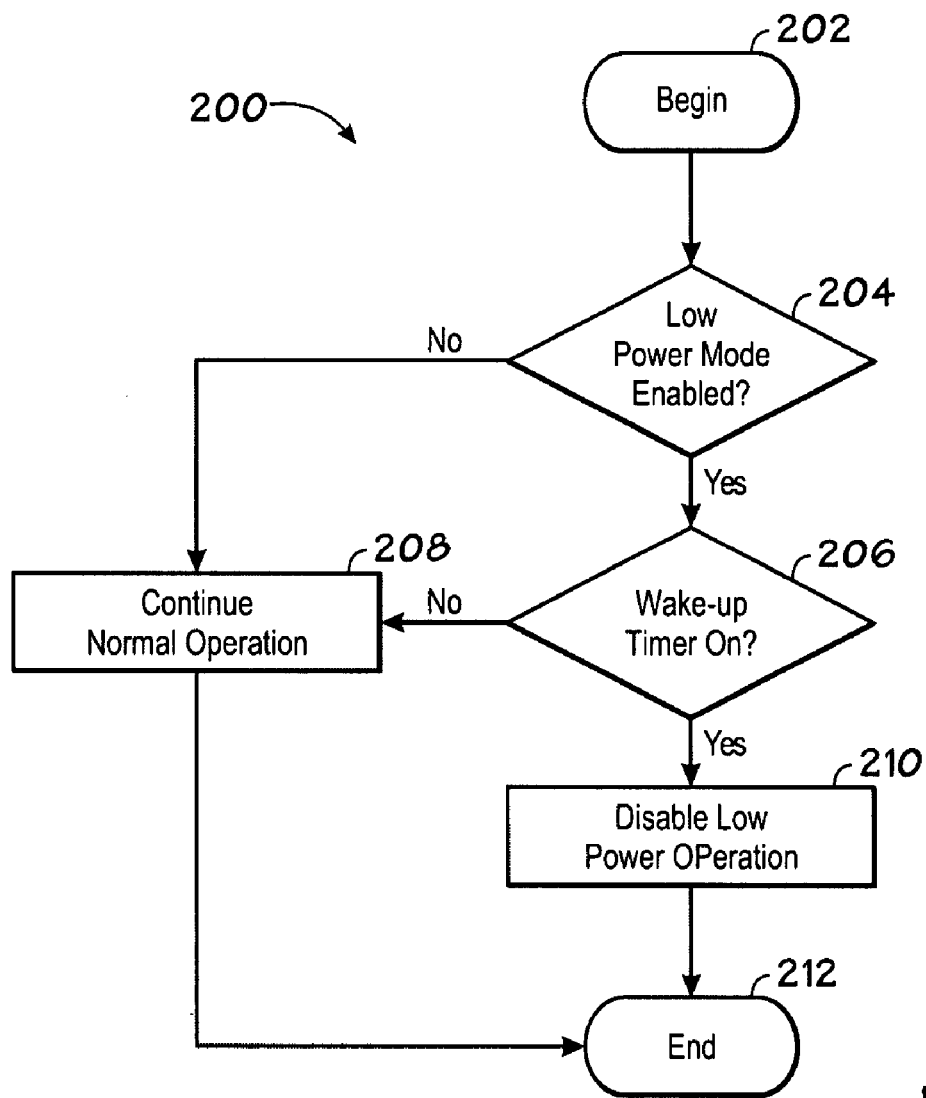
FIG. 2 is a process flow diagram illustrating a method in accordance with an exemplary embodiment of the present invention.

FIG. 2 is a process flow diagram illustrating a method in accordance with an exemplary embodiment of the present invention.

An exemplary embodiment of the present invention is adapted to maintain operation of certain functionality (for example, wake-up timer operation) without the necessity of a second microcontroller such as a low power microcontroller. For example, the exemplary embodiment illustrated in FIG. 2 is adapted to override a user selection of low power operation whenever a wake-up timer event is scheduled. In the exemplary embodiment illustrated in FIG. 2, a determination is made as to whether the low power mode has been enabled by the user. If low power mode is not enabled, normal system operation continues. As used herein, the expressions "normal operation" or "normal system operation" refer to when a user selection of low power mode is not overridden in accordance with an exemplary embodiment of the present invention. In other words, normal operation occurs when the system is acting as it has been instructed by the user. Moreover, the "normal operation" of the system includes operation in low power mode if low power mode is selected by the user and low power mode is not overridden because of an event such as the setting of a wake-up timer in accordance with an exemplary embodiment of the present invention. If low power operation has been enabled, a determination is made about whether a wake-up timer has been set. If no wake-up timer has been set, normal system operation continues, and the unit enters low power mode. If a wake-up timer is set and low power mode has been enabled by the user, the normal operation of the system entering low power mode is overridden to allow processing of the wake-up timer by the system microcontroller 106 (FIG. 1).

An advantage provided by an exemplary embodiment of the present invention is that wake-up timers function when they are enabled without the necessity of a separate low power microcontroller, but low power benefits can be realized when wake timers are not enabled. This provides a lower cost solution than the use of a low power microcontroller.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. An electronic device, comprising:
   a wake-up timer; and
   a low power override circuit that is adapted to determine whether a low power mode is enabled for the electronic device and whether the wake-up timer is set, wherein the low power override circuit is adapted to prevent low power operation of the electronic device if the low power mode is enabled for the electronic device and the wake-up timer is set.

2. The electronic device recited in claim 1, wherein the low power override circuit is adapted to initialize a processor to respond to the wake-up timer if the low power operation is prevented.

3. The electronic device recited in claim 1, comprising a display that is adapted to display images under the control of a processor.

4. The electronic device recited in claim 1, wherein the low power override circuit is adapted to allow low power operation if the low power mode is enabled for the electronic device and the wake-up timer is not set.

5. The electronic device recited in claim 1, wherein the electronic device comprises a television.

6. The electronic device recited in claim 1, wherein the electronic device comprises a digital video recorder.

7. The electronic device recited in claim 1, wherein the electronic device comprises a set top cable box.

8. The electronic device recited in claim 1, wherein the low power override circuit is implemented entirely in a field programmable gate array (FPGA).

9. A method of operating an electronic device, comprising:
   determining if a low power mode is enabled for the electronic device;
   continuing normal operation if the low power mode is not enabled for the electronic device;
   determining if a wake-up timer is set if the low power mode is enabled for the electronic device;
   allowing low power operation if the low power mode is enabled for the electronic device and the wake-up timer is not set; and
   preventing low power operation if the low power mode is enabled for the electronic device and the wake-up timer is set.

10. The method recited in claim 9, comprising powering up a processor to respond to the wake-up timer if the low power operation is prevented.

11. The method recited in claim 9, wherein the electronic device is adapted to display an image under control of a processor.

12. The method recited in claim 9, comprising continuing normal operation if the low power mode is enabled for the electronic device and the wake-up timer is not set.

13. The method recited in claim 9, wherein the electronic device comprises a television.

14. The method recited in claim 9, wherein the electronic device comprises a digital video recorder.

15. The method recited in claim 9, wherein the electronic device comprises a set top cable box.

16. The method recited in claim 9, wherein the recited acts are performed in the recited order.

17. An electronic device, comprising:
    a wake-up timer;
    means for determining whether a low power mode is enabled for the electronic device and whether the wake-up timer is set; and
    means for preventing low power operation of the electronic device if the low power mode is enabled for the electronic device and the wake-up timer is set.

18. The electronic device recited in claim 17, comprising means for initializing a processor to respond to the wake-up timer if the low power operation is prevented.

19. The electronic device recited in claim 17, comprising a display that is adapted to display images under the control of a processor.

20. The electronic device recited in claim 1, wherein the electronic device comprises a television.

* * * * *